H. G. LOCKE.
HOP-PICKING MACHINES.
No. 195,140. Patented Sept. 11, 1877.
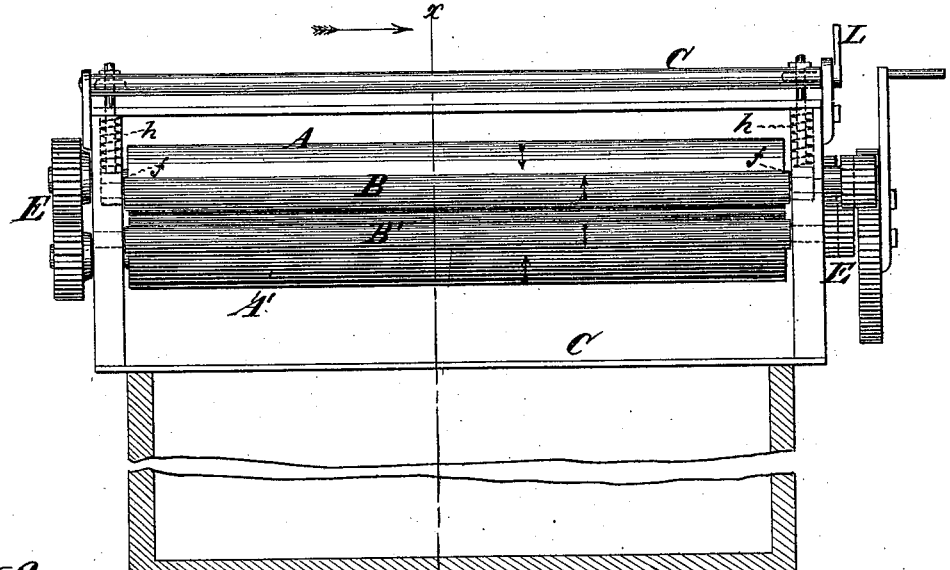
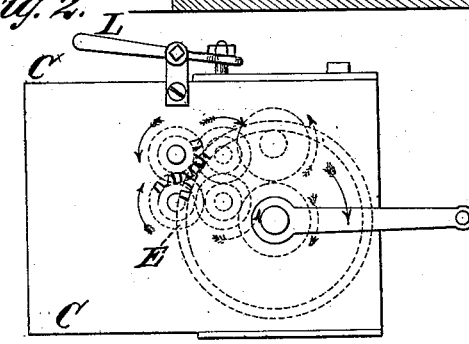
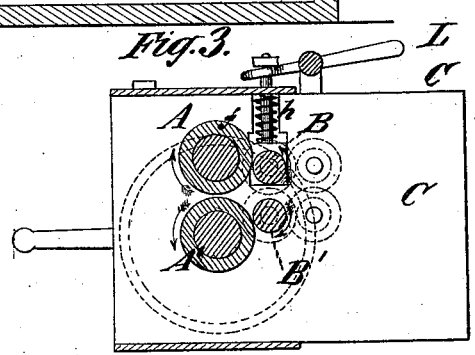
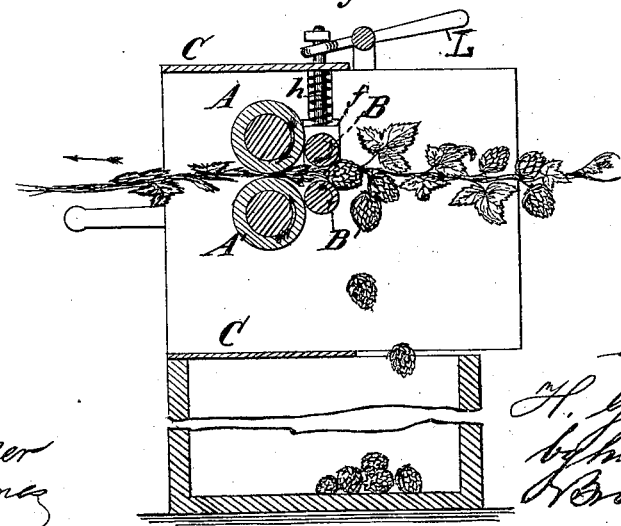
Witnesses
John Becker
Fred Haynes
Inventor
H. G. Locke
by his Attorneys
Brown & Allen

UNITED STATES PATENT OFFICE.

HERBERT G. LOCKE, OF WATERVILLE, NEW YORK.

IMPROVEMENT IN HOP-PICKING MACHINES.

Specification forming part of Letters Patent No. 195,110, dated September 11, 1877; application filed April 3, 1877.

*To all whom it may concern:*

Be it known that I, HERBERT G. LOCKE, of Waterville, in the county of Oneida and State of New York, have invented an Improved Hop-Picking Machine; and I do hereby declare that the following is a full, clear, and exact description of the same, reference being had to the accompanying drawing, forming part of this specification.

The picking of hops is the most expensive and troublesome operation connected with their production. The picking is required to be done within a limited period, so short as to necessitate a large number of hands, with difficulty obtained at a season when the harvesting of other crops requires an extra amount of time, labor, and attention. The large number of hands required necessitates extraordinary provision for their board and lodging, and the employment of sufficient help to harvest in good condition the growth of a large hop-yard entails upon the proprietor a great deal of expense and trouble. For these and other reasons a good machine for picking hops has become a great desideratum to hop-growers. Such a machine is supplied by my invention, which partly consists in clamping-rollers and picking-rollers arranged in a suitable framework to rotate in due relation with each other, the clamping-rollers to clamp the hop-bine and pull it through between the picking-rollers, said picking-rollers rotating in opposite directions as regards themselves, and each of said picking-rollers rotating in an opposite direction to that of one of the clamping-rollers, and in the same direction as that of another clamping-roller, in such manner that when the hop-bine is engaged by the clamping-rollers, and the whole operated by suitable gearing, the said hop-bine will be drawn entirely through between the picking-rollers, which pull or pick the hops off from said bine, no hand-labor being required for the picking except to supply the machine with bines, as required.

The invention consists, further, in the combination, with the clamping-rollers and picking-rollers and a system of gearing for transmitting motion to said rollers, of a lifting device applied to one of the picking-rollers, the said lifting device consisting of a lever connected with the upper picking-roller, which has its bearings acted on by springs, in such manner that, by depressing said lever, the upper picking-roller will be lifted, while the springs acting on its bearings will automatically throw the roller into its normal position, as hereinafter described.

Figure 1 in the accompanying drawing is a side view of the machine, the picking-rollers being presented to the front. Fig. 2 is an end view of the machine, showing a portion of the gearing through which the rollers are actuated. Figs. 3 and 4 are sections on the line $x\ x$ in Fig. 1, Fig. 4 showing the rollers as operating upon a hop-bine to pick or pull the hops therefrom, as hereinafter described.

A variety of methods for rotating the rollers may be devised, and I do not confine myself to any particular method, reserving the right to actuate the rollers (which, arranged substantially in the relation hereinafter described, constitute the essential part of my invention) either by hand, horse, steam, or other power, and to use any suitable system of gearing which will rotate said rollers in proper relation with each other.

A and A' in the drawing represent the clamping-rollers, preferably made of elastic material, or having a hard central portion clothed with soft elastic material, (such as rubber, leather, felt, &c.,) but which may be made entirely of wood, metal, or other suitable hard material, and which may also be fluted, if desired, or otherwise constructed so as to firmly clamp a hop-bine.

B and B' represent the picking-rollers, or the rollers which pick, pull, or pluck the hops from the bine. Said picking-rollers may be made of any suitable material, either hard or soft, with smooth or rough surfaces.

The said clamping-rollers A A' are preferably, but not necessarily, made of greater diameter than the picking-rollers B B'. The said clamping-rollers may have the same or a less diameter than the picking-rollers. The machine will work very well with clamping and picking rollers having the same circumferential velocity; but it is preferable for the picking-rollers to have the greater circumferential velocity, either by the use of multiplying gearing or otherwise.

The said rollers are arranged in relation with each other, as shown in Figs. 3 and 4, and they have bearings in a suitable frame-work, C.

A suitable system of gearing, E, is arranged to transmit motion from any suitable prime mover to the rollers, in such manner that each pair of rollers, when in motion, rotates as indicated by the arrows—that is, each of the clamping-rollers rotates in an opposite direction to that of its fellow, and each of the picking-rollers revolves in an opposite direction to that of its fellow, the circumferential motion of that portion of the parts of the clamping-rollers nearest to each other being in a direction away from the picking-rollers, and the circumferential motion of the parts of the picking-rollers which are nearest each other being in the opposite direction, or away from the clamping-rollers.

One of the picking-rollers B B' may have adjustable bearings; or it may have movable bearings $f$, pressed toward the other picking-roller by springs $h$, a lever, L, suitably connected with said roller having the spring-bearings, being employed to lift said roller away from the roller having fixed bearings.

The operation of the machine is as follows: The upper picking-roller, B, is adjusted to approach the lower one, B', near enough to prevent the ament-like fruit (hops) of the hop-bine from passing through the space between said rollers, but not so near as to prevent the free passage of the bine, leaves, and stems of the plant.

The machine may be arranged on the top of a box to catch the picked hops as they fall from the bine; or the picked hops may be otherwise collected.

The bine is passed, preferably butt-end first, between the picking-rollers B B', and the end of the bine is engaged between the clamping-rollers A A'. The continued rotation of the said clamping-rollers draws the bine through between the said picking-rollers, and the hops, which cannot pass through between the picking-rollers, are pulled off and fall, as shown in Fig. 4. The circumferential motion of the picking-rollers at their inner parts, being in an opposite direction to that in which the bine is pulled by the clamping-rollers, prevents any crushing of the hops or clogging of the space between said picking-rollers.

The hops are thus rapidly picked from the bine in good condition and with unprecedented rapidity.

I claim—

1. In a hop-picking machine, the combination of two rollers for clamping the hop-vine, and two rollers near and substantially in line with the clamping-rollers for picking off the hops, said picking-rollers and clamping-rollers revolving in opposite directions, substantially as described.

2. The combination, with the rollers A A' for clamping the vine, and the picking-rollers B B', having bearings $f$ acted upon by springs $h$, of a lever connected with the roller B for raising said roller, as and for the purpose described.

HERBERT G. LOCKE.

Witnesses:
WILLIAM J. BROWN,
C. L. TERRY.